(12) United States Patent
Dahlquist

(10) Patent No.: US 8,308,169 B2
(45) Date of Patent: Nov. 13, 2012

(54) CHUCKING FIXTURE WITH DEVICE FOR MEASURING THE DISTANCE BETWEEN A CHUNK AND A TOOLHOLDER OR WORKHOLDER

(75) Inventor: Håkan Dahlquist, Hässelby (SE)

(73) Assignee: System 3R International AB, Vällingby (SE)

( * ) Notice: Subject to any disclaimer, the term of this patent is extended or adjusted under 35 U.S.C. 154(b) by 1052 days.

(21) Appl. No.: 12/295,887

(22) PCT Filed: Mar. 2, 2007

(86) PCT No.: PCT/EP2007/001797
§ 371 (c)(1),
(2), (4) Date: Oct. 3, 2008

(87) PCT Pub. No.: WO2007/124809
PCT Pub. Date: Aug. 11, 2007

(65) Prior Publication Data
US 2009/0315280 A1    Dec. 24, 2009

(30) Foreign Application Priority Data
Apr. 27, 2006    (EP) ................................ 06008711

(51) Int. Cl.
*B23B 31/02*    (2006.01)

(52) U.S. Cl. ........................................ 279/126
(58) Field of Classification Search ............ 356/477, 356/500, 482; 279/126, 142
See application file for complete search history.

(56) References Cited

U.S. PATENT DOCUMENTS

| | | | | |
|---|---|---|---|---|
| 4,365,301 | A | * | 12/1982 | Arnold et al. ................. 700/195 |
| 4,536,000 | A | * | 8/1985 | Rohm ............................ 279/126 |
| 4,770,575 | A | | 9/1988 | Kölblin et al. |
| 4,855,558 | A | | 8/1989 | Ramsbro |
| 5,781,295 | A | | 7/1998 | Fuchs et al. |

FOREIGN PATENT DOCUMENTS
DE    3625608    4/1988
* cited by examiner

*Primary Examiner* — Tarifur Chowdhury
*Assistant Examiner* — Jonathan Hansen
(74) *Attorney, Agent, or Firm* — Bachman & LaPointe, P.C.

(57) ABSTRACT

A chucking fixture for a tool or a workpiece, comprising a chuck and a toolholder or workholder matching the chuck, wherein the chuck has posts having bearing surfaces for orienting the tool or workpiece in an X and Y direction and having end faces for establishing a plane perpendicular to the Z direction, wherein devices for measuring the distance between the chuck and the toolholder or workholder are formed in the bearing surfaces and in the end faces.

9 Claims, 5 Drawing Sheets

CHUCKING FIXTURE WITH DEVICE FOR MEASURING THE DISTANCE BETWEEN A CHUNK AND A TOOLHOLDER OR WORKHOLDER

BACKGROUND OF THE INVENTION

The invention relates to a chucking fixture for a tool or a workpiece, comprising a chuck and a toolholder or workholder matching the chuck, the chuck having posts having bearing surfaces for orienting the tool or workpiece in an X and Y direction and having end faces for establishing a plane perpendicular to the Z direction.

In machine tool building, chucking fixtures are used to secure tools and/or workpieces at a precisely defined position in an X-Y-Z coordinate system. The tool is, for example, an electrode used in a vertical eroding system to machine a workpiece by means of spark erosion. The tool, in this case for example the electrode, is inserted in a toolholder which is received by a matching chuck. In the manufacture of molds for injection-molded products in which high requirements are placed on dimensional precision, at least as high requirements are placed on the precision of the injection molds. The reproducibility of the clamping process of the different tools which are used in the course of the machining and of the workpieces also has an influence on the dimensional precision and on the appearance of the product. Conventional commercial chucking fixtures achieve positional precision of +/−2 μm.

A generic chucking fixture is known from EP 255 042 B1. The chucking fixture has, arranged at right angles to each other, two pairs of grooves and two pairs of strips having resilient lips. The chucking fixture is used, for example, to clamp the electrode in a vertical erosion system.

A device for absolute distance measurement is known from DE 195 28 676 C2. The device comprises an optical interferometer having optical fibers, with two lasers as light sources, the wavelength of at least one laser being tunable, with beam splitters, photoelectric receivers and with a computer for evaluating the signals and for calculating the distance with a precision in the nanometer range.

It is the object of the invention to provide a chucking fixture which allows precise and reproducible clamping in the nanometer range and takes up as little space as possible in the machining system.

The object is achieved by providing a chucking fixture for a tool or a workpiece, comprising a chuck and a toolholder or workholder matching the chuck, the chuck having posts having bearing surfaces for orienting the tool or workpiece in an X and Y direction and having end faces for establishing a plane perpendicular to the Z direction, devices for measuring the distance between the chuck and the toolholder or workholder being formed in the bearing surfaces and in the end faces.

It is advantageous that the chucking fixture, at a precision in the nanometer range, takes up as little space as possible in the machining system. This is achieved as a result of the fact that the devices for measuring the distance are formed as optical interferometers.

It is also advantageous that the chucking fixture can be used to measure, in addition to the absolute distance measurement, also forces such as, for example, torsional forces or vibrations. This is achieved as a result of the fact that the optical interferometers are coupled to an electronic evaluation system.

It is furthermore also advantageous that the chucking fixture can be used to measure the change in dimension as a result of the change in temperature. This is achieved as a result of the fact that the optical interferometers are arranged on opposing bearing surfaces and/or end faces of the chucks and/or toolholders. A measuring device on two opposing sides of a groove or a strip of the chucking fixture increases the reliability of the measurement and allows thermal expansion to be corrected.

The core idea of the invention is to have contactless measurement integrated in the chucking fixture of a vertical erosion system. If the measuring device is integrated in the chucking fixture, external measurements on the clamped tool or workpiece are dispensed with. The measured values obtained by the electronic evaluation system can be used to correct the position of the chucking fixture. This saves time for clamping and unclamping and greatly improves the precision of the positioning.

BRIEF DESCRIPTION OF THE DRAWINGS

An exemplary embodiment of the invention will be described with reference to the figures, in which.

DETAILED DESCRIPTION

Figure 1:
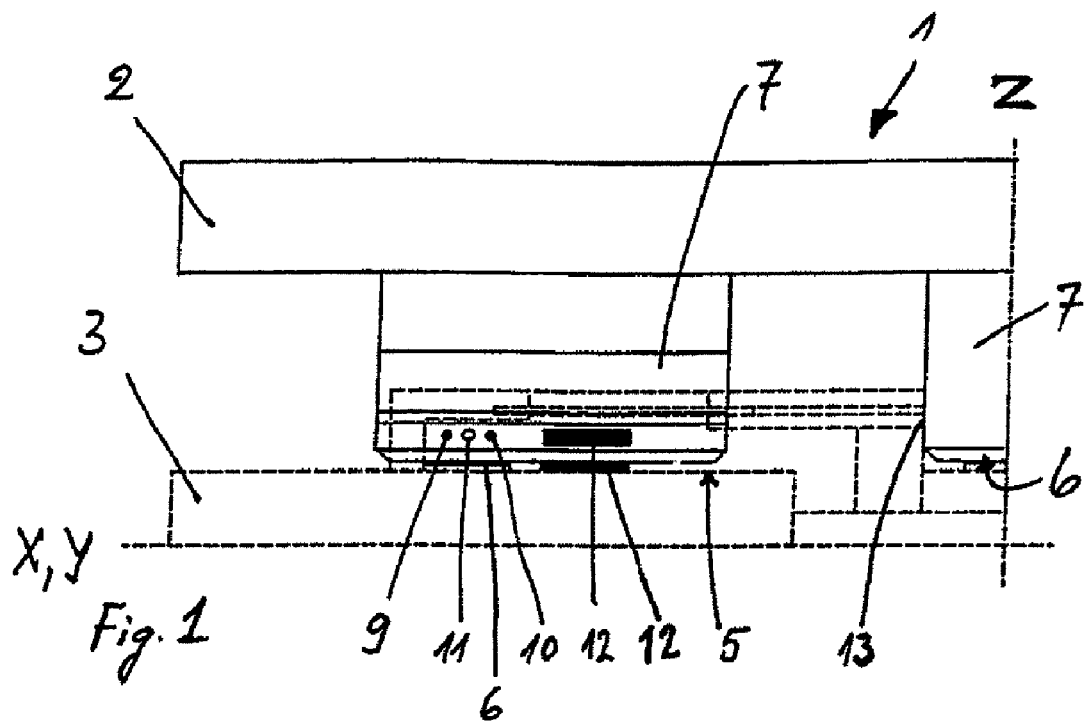
FIG. 1 is a section through a chucking fixture according to the invention.

FIG. 1 is a cross section of a chucking fixture 1 for an electroerosion system. Because the chucking fixture 1 is formed symmetrically in the direction of the X and Y axes, FIG. 1 shows merely one half of the chucking fixture 1. The chucking fixture 1 consists of a chuck 2 and a matching workholder or toolholder 3. The chuck 2 has, both in the direction of the X axis and in the direction of the Y axis, two respective posts 7 having end faces 6 arranged at an angle of 90°.

FIG. 2 is again a view from below, i.e. viewed from the workholder or toolholder 3, of the chuck 2 of the chucking fixture 1 from FIG. 1. What are known as Z islands 20 are formed between the posts 7. Measuring devices 4 for measuring the distance between the chuck 2 and the toolholder 3 are shown on the end faces 6 on the underside of the posts 7 of the chuck 2. The measuring device 4 is arranged flush with the end faces 6 of the posts 7. Each measuring device 4 comprises an optical interferometer 8 having two optical fibers 9, 10. One optical fiber 10 serves as the reference optical fiber. The reference optical fiber 10 is used inter alia to measure the reflection properties of the workpiece. A bore 11 for a rinsing medium is formed between the two optical fibers 9, 10. The rinsing medium can be gaseous or liquid, for example air or the rinsing liquid of the electroerosion system.

Arranged adjacent to the optical interferometer 8 is a piezoactive element 12. The piezoactive element 12 securely clamps and holds the chucking fixture 1 in a relatively narrow range of a few microns. The distance measurement in the nanometer range is carried out by the interferometer 8 only once the chucking fixture 1 is securely clamped within the range of action of the piezoactive element 12. The piezoactive elements 12 are preferably formed as thin-layer foils having low resistance to shearing forces. A plurality of laser light sources having a differing or tunable wavelength are connected to each optical fiber 9, 10.

The optical fibers 9, 10 are connected to an electronic evaluation system. The electronic evaluation system is used to control inter alia the wavelength and the pulse duration of the various lasers. Certain regions of the surfaces 5, which are formed on the toolholder 3 opposing the measuring device 4 of the chuck 2, are formed as surfaces 23, 24 for reflecting the light from the optical fibers 9, 10. The device described in the present document can be used to position the chucking fixture 1 in the Z direction with a precision of a few nanometers.

Figure 2:
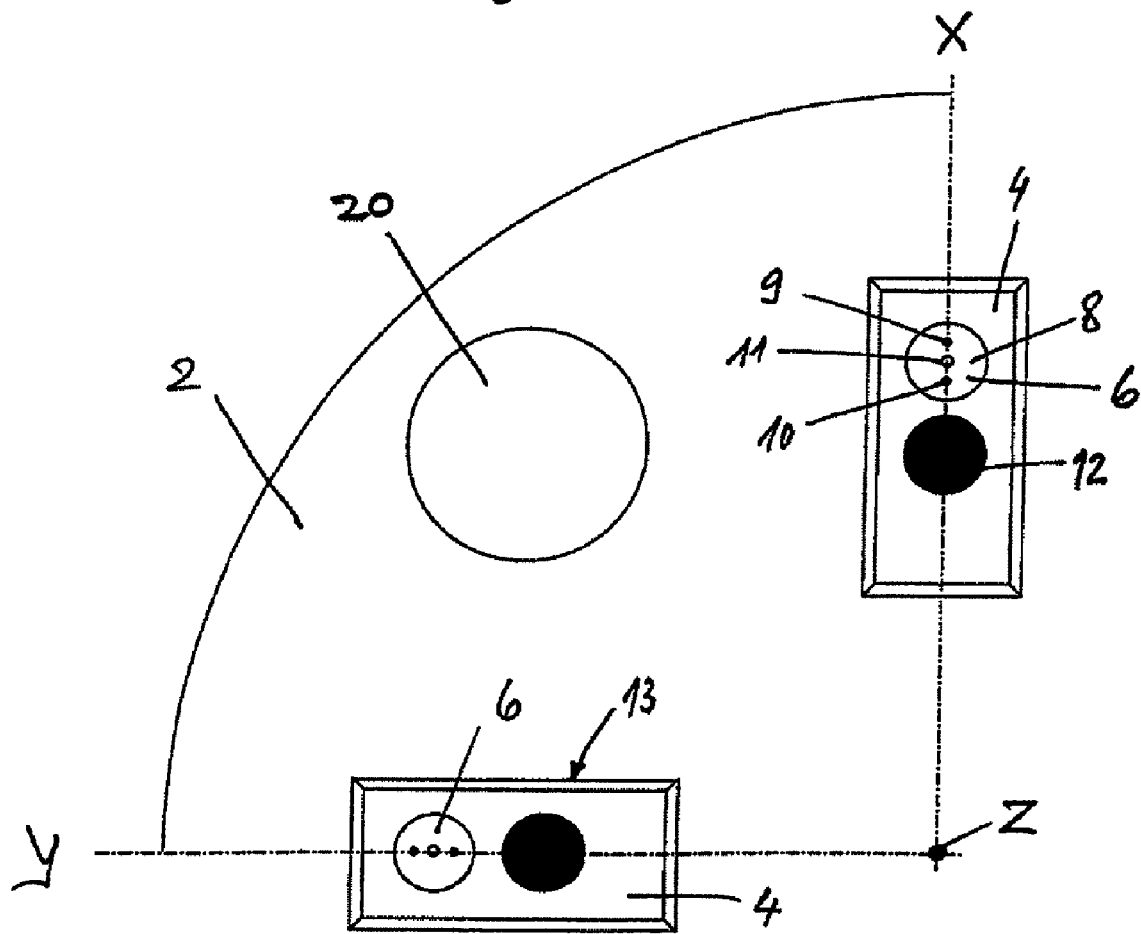
FIG. 2 is a view onto the chucking fixture from FIG. 1.
Figure 3:
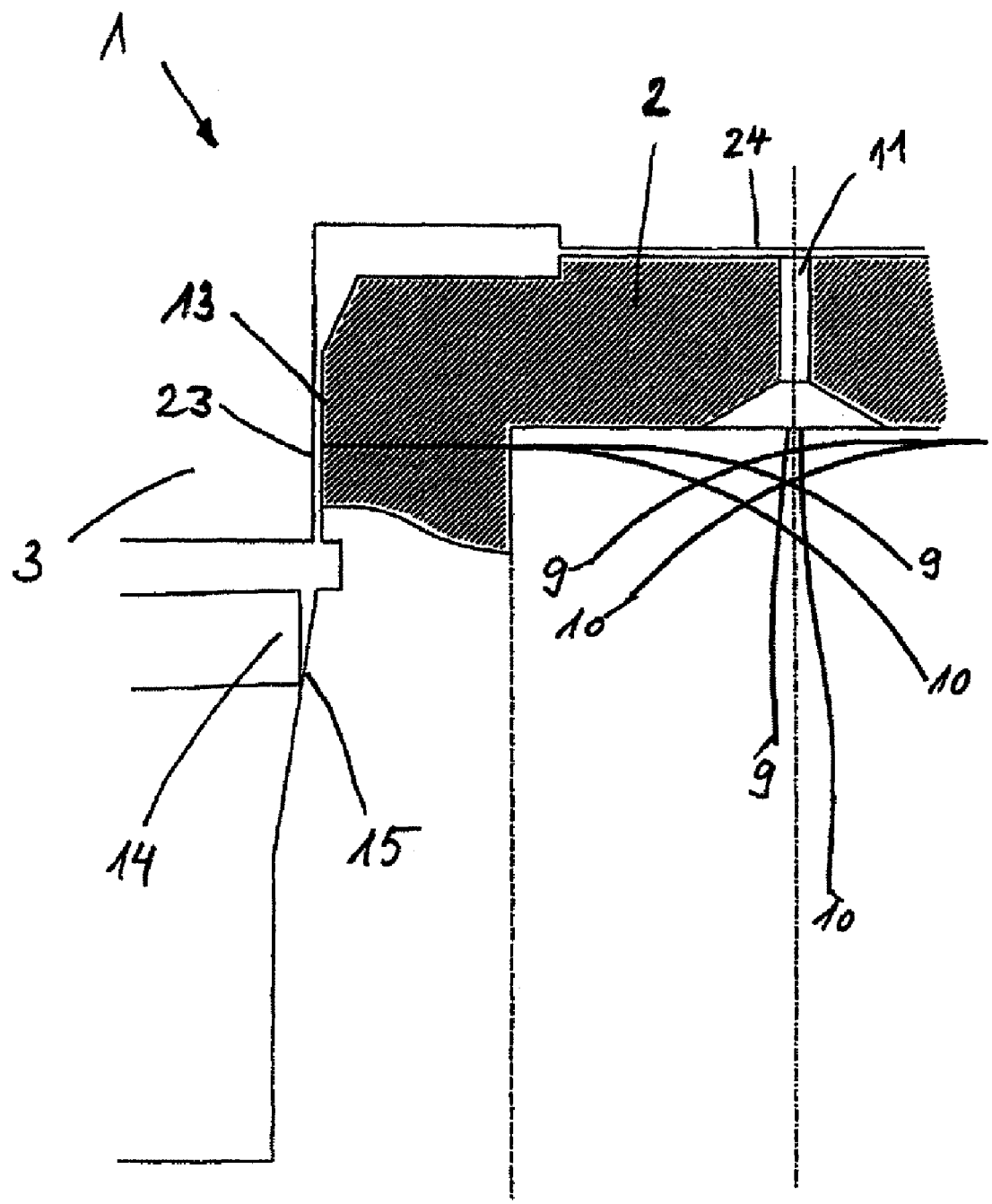
FIG. 3 shows a region of the chucking fixture cut along the center line.
Figure 4:
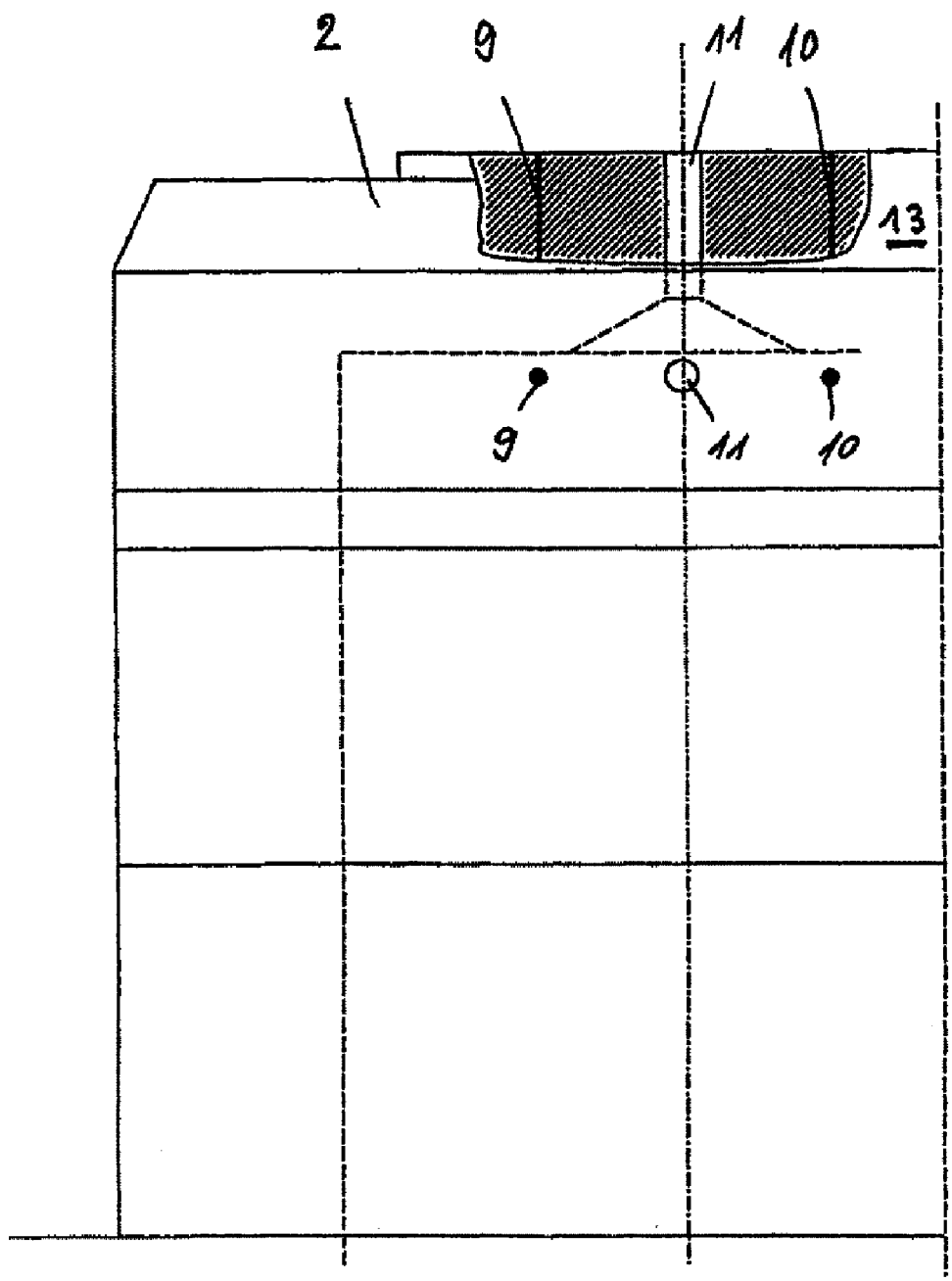
FIG. 4 shows a region of the chucking fixture cut along the center line and perpendicular to the section of FIG. 3.

FIG. 3 is a cross section of the chucking fixture 1 in the radial direction, i.e. through one of the four posts 7. FIG. 2 shows the chucking fixture 1 in the tensioned state. FIGS. 3 and 4 show the bearing surfaces 13 which serve to establish the chuck 2 in the direction of the X and/or Y axis. Further optical fibers 9, reference optical fibers 10 and bores 11 for the rinsing medium are shown in this case, both in the direction of the X or Y axis and in the direction of the Z axis. The function of the devices 4 for measuring distance is identical to the devices 4 described under FIGS. 1 and 2. If interacting optical interferometers 8 are arranged on both opposing bearing surfaces 13, the expansion of the chuck 2, for example as a result of the rise in temperature during machining, can be measured and compensated for. FIG. 3 also shows a resilient region 14, formed in the shape of a tongue, of the toolholder or workholder 3.

Figure 5:
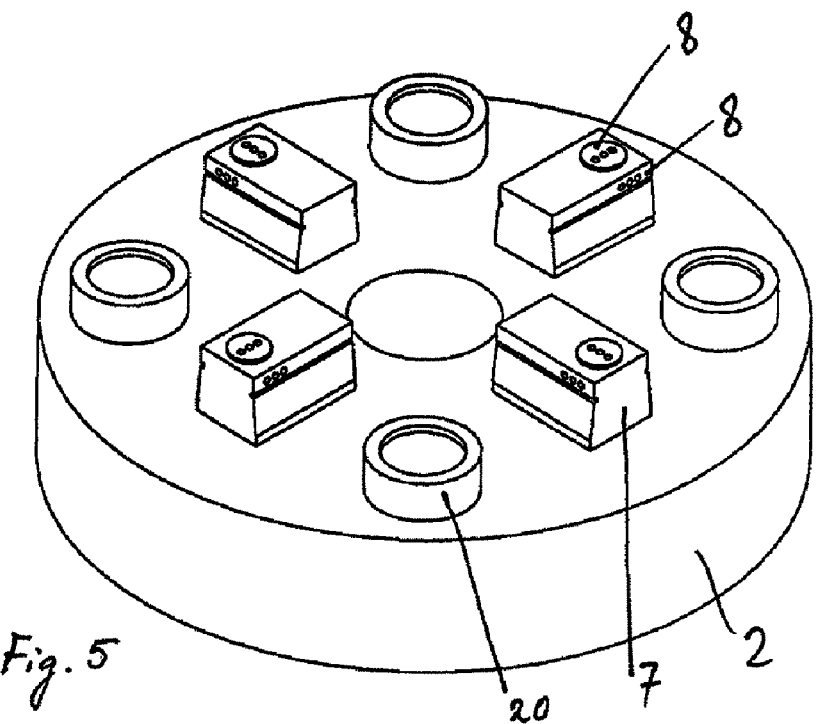
FIG. 5 is a perspective view onto the chuck viewed from the side of the toolholder or the workholder.
Figure 6:
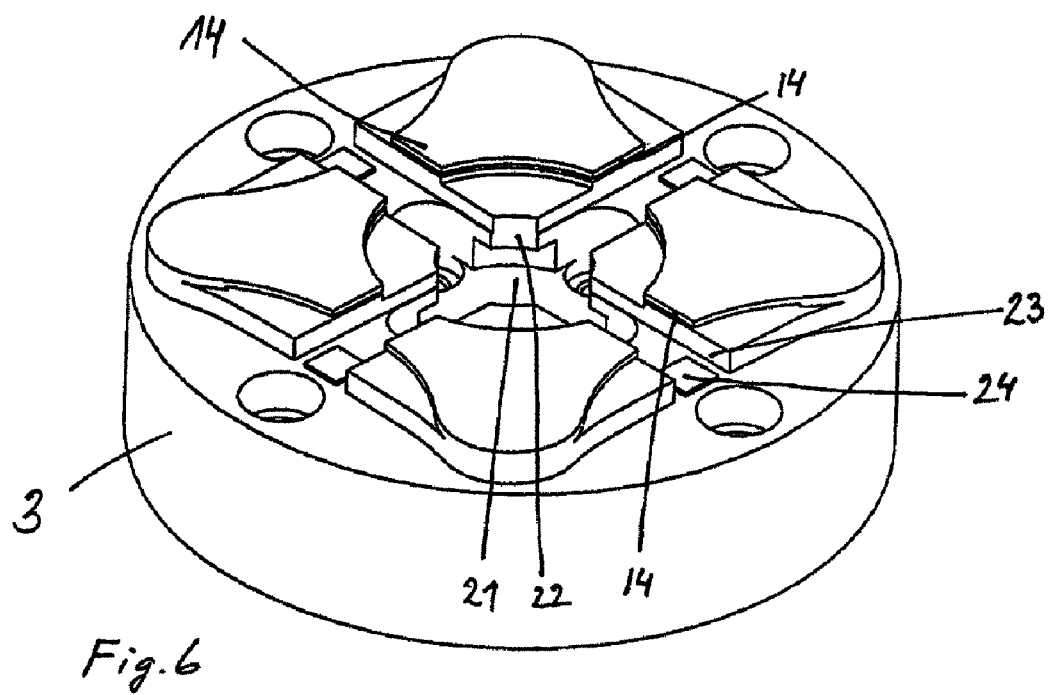
FIG. 6 is a perspective view onto the toolholder or workholder viewed from the side of the chuck.

FIG. 5 shows the chucking fixture 1, looking onto the chuck 2. FIG. 6 shows the matching toolholder or workholder 3. FIG. 5 shows how the chuck 2 has up to eight optical interferometers 8 for measurements in the direction of the X and Y axes and four further optical interferometers 8 for measurement in the direction of the Z axis. The workholder 3 has eight resilient regions 14 which are formed in the shape of tongues and interact with conically formed regions 15 on the chuck 2. This allows the workpiece or the tool to be clamped in a force-transmitting manner. Movement in the direction of the Z axis is likewise monitored and corrected by optical interferometers 8. The central hole 21, which is provided to receive the tool, is formed with projections 22, thus allowing the tool (not shown here) to be secured in the manner of a bayonet coupling. FIG. 6 also shows the specially ground reflection surfaces 23, 24 which interact with the optical interferometers 8 of the chuck 2.

Figure 7:
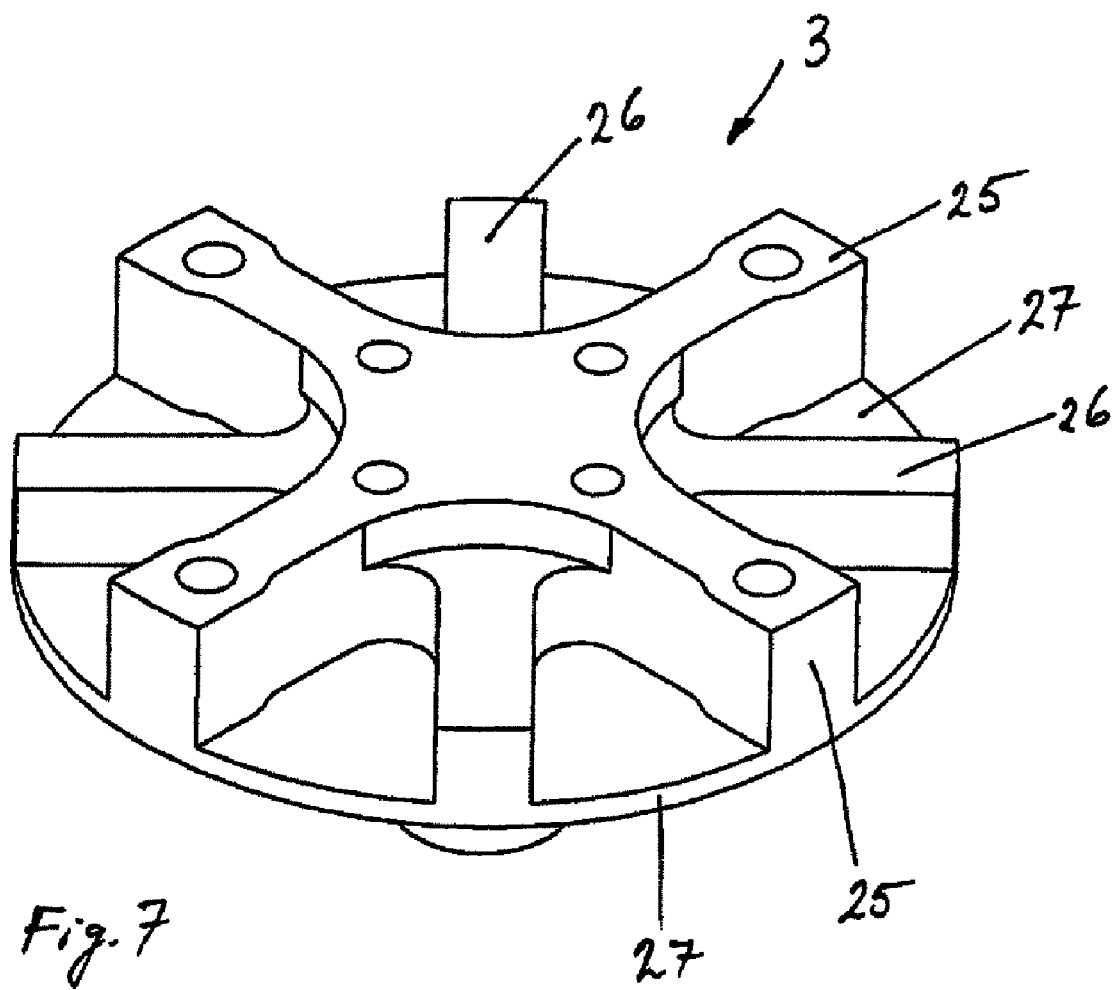
FIG. 7 is a perspective view onto the toolholder or workholder viewed from the opposing side.

FIG. 7 is again a perspective view, from the opposing side, of the workpiece or toolholder 3. The toolholder 3 has two main bars 25, which are formed on the underside of the toolholder in the direction of the X and Y axes, and also two further reinforcing bars 26 arranged at an angle of 45° between the main bars 25. The flat region 27 between the bars 25, 26 is relatively thin in its configuration. The main bars 25 are configured so as to be relatively thick compared to the reinforcing bars 26. As a result, the toolholder 3 has higher resilience in the Z direction than in the remaining directions.

The chucking fixture 1 described in the present document allows the position in the X-Y-Z coordinate system after clamping to be measured with a precision in the nanometer range and secured continuously. The information of the precise position is, for example, used to calculate the forces acting on the workpiece or the tool during machining. The information can also be used to compensate for vibrations occurring during machining and/or to monitor wear to the tool. The measurement of the position in the direction of the X, the Y and the Z axis allows all degrees of freedom of the movement of the workpiece or the tool to be measured and controlled. Thus, even workpieces having a complex geometrical shape, such as for example optical lenses, or the injection molds therefor, having specially shaped surfaces, can be manufactured with the desired precision.

The measurement is carried out during machining. External measuring devices, which take up space and which cannot be used in movable chucking fixtures, are not required. Detachment and reinstallation, with an interim time-consuming check of the workpieces, are dispensed with. The optical interferometers 8 are particularly suitable for measuring distances in the submicron range. Because the check of the workpiece or the tool is continuously adapted to the conditions of the machining process, machining can be carried out also over a relatively long time, for example overnight, with high precision. The effects of vibration and thermal expansion of the tool on the surface quality of the workpiece are corrected no longer on the tool but rather on the clamped workpiece itself. The tongue-shaped resilient regions 14 on the workholder or toolholder 3 are likewise contactlessly monitored by optical interferometers 8. Thus, movements of the workpiece in the direction of the Z axis are measured and taken into account during machining.

The chucking fixture 1 having the optical interferometers 8 is first mechanically clamped at the start of machining. The toolholder 3 and the chuck 2 are located at a distance of a few micrometers from the zero point of the X-Y-Z coordinate system. Subsequently, all of the optical interferometers 8 are calibrated at a defined wavelength and intensity with the aid of the interference optical fibers 10 and the specially ground surfaces 23, 24. Afterwards, the absolute distance between the chuck 2 and toolholder 3 is measured in the nanometer range. For this purpose, laser light having, for example, four different wavelengths is transmitted and received through each of the twelve optical fibers 9. The received reflected light signals are introduced in the electronic evaluation system, converted and the absolute distance in the direction of the X, Y and Z axes is calculated.

The difference between the reference coordinate system, which was established with the mechanical clamping, and the deviations measured by the optical interferometer system are retained in the control system of the machining system. Both the differences resulting from displacements and the differences resulting from torsions are measured and stored. During the subsequent machining of the workpiece, merely a check measurement at a wavelength is required. If the chucking fixture 2 is equipped with piezoactive elements 12, small changes in distance, resulting from the action of forces, the action of torques, vibrations or changes in temperature, can be corrected. Optimum geometrical dimensional precision in the nanometer range can be achieved.

The invention claimed is:

1. A chucking fixture for a tool or a workpiece, comprising a chuck and a toolholder or workholder matching the chuck, the chuck having posts having bearing surfaces for orienting the tool or workpiece in an X and Y direction and having end faces for establishing a plane perpendicular to the Z direction, measuring devices for measuring the distance between the chuck and the toolholder or workholder are formed in the bearing surfaces and in the end faces.

2. The chucking fixture as claimed in claim 1, wherein the measuring devices for measuring the distance are formed as optical interferometers.

3. The chucking fixture as claimed in claim 2, wherein the optical interferometers are coupled to an electronic evaluation system.

4. The chucking fixture as claimed in claim 2, wherein the optical interferometers are arranged on mutually opposing bearing surfaces of the post of the chuck.

5. The chucking fixture as claimed in claim 2, wherein the optical interferometer has an optical fiber and a further optical fiber is arranged adjacent the optical interferometer as a reference.

6. The chucking fixture as claimed in claim 5, wherein a bore for a rinsing medium is formed between the reference optical fiber and the optical interferometer.

7. The chucking fixture as claimed in claim 2, wherein a piezoactive device is arranged adjacent to the optical interferometer.

8. The chucking fixture as claimed in claim 1, wherein the toolholder has tongue-shaped resilient regions for orienting relative to matchingly formed regions of the chuck.

9. A method for machining workpieces using a chucking fixture according to claim 2, comprising the steps of:

(a) mechanically clamping the toolholder or workholder in the chuck;
(b) calibrating the optical interferometers with the aid of the reference optical fiber on the chuck and a specially ground reflection surfaces on the toolholder or workholder;
(c) measuring an absolute distance between the chuck and a toolholder or workholder;
(d) calculating displacements and torsions in the X-Y-Z coordinate system prior to machining;
(e) calculating the displacements and torsions in the X-Y-Z coordinate system during machining; and
(f) calculating and compensating for the displacements and torsions in the X-Y-Z coordinate system with the aid of piezoactive elements.

* * * * *